United States Patent [19]

Carlson et al.

[11] Patent Number: 4,670,154
[45] Date of Patent: Jun. 2, 1987

[54] MIXED RESIN BED DEIONIZER

[75] Inventors: Lee G. Carlson, Willow Springs; Conrad Terrien, Elmhurst; Roger Queisser, Long Grove, all of Ill.

[73] Assignee: UIP Engineered Products Corporation, Addison, Ill.

[21] Appl. No.: 803,563

[22] Filed: Dec. 2, 1985

[51] Int. Cl.$^4$ .......................... C02F 1/42; B01J 49/00
[52] U.S. Cl. .................................. 210/675; 210/686; 210/189; 210/269
[58] Field of Search ............... 210/675, 676, 686, 189, 210/268, 269

[56] References Cited

U.S. PATENT DOCUMENTS 3,775,310 11/1973 Conway et al. ............... 210/686
4,461,710 7/1984 Erickson et al. ............... 210/675

Primary Examiner—Ivars Cintins
Attorney, Agent, or Firm—Ronald E. Barry

[57] ABSTRACT

A mixed resin bed deionizing apparatus for removing toxic or mineral substances from fluid passing through a loading vessel containing a mixed bed of cation and anion resins and a regeneration assembly for regenerating the cation and anion resins for return to the loading vessel, the assembly including a separation vessel for separating the cation and anion resins and two "U"-shaped regeneration vessels, one for regenerating cation resins and one for regenerating aniona resins, the resins being admitted to the regeneration vessels in predetermined amounts which are advanced through the regeneration vessels by removing a predetermined amounts of regenerated resin from the discharge end of the vessel, shifting the remaining resin in the vessel to refill the space in the discharge end and adding a corresponding amount of exhausted or loaded resin to the other end, passing a regenerant through the regeneration vessel counter to the direction of movement of the resin through the regeneration vessel and rinsing the resin at the discharge end of the vessel with product water prior to discharge from the vessel, the resins discharged from the regeneration vessels being collected in a holding tank for subsequent return to the loading vessel. A cyanide stripping assembly can be provided to remove cyanide from the anion resin prior to admission into the anion regeneration vessel.

15 Claims, 2 Drawing Figures

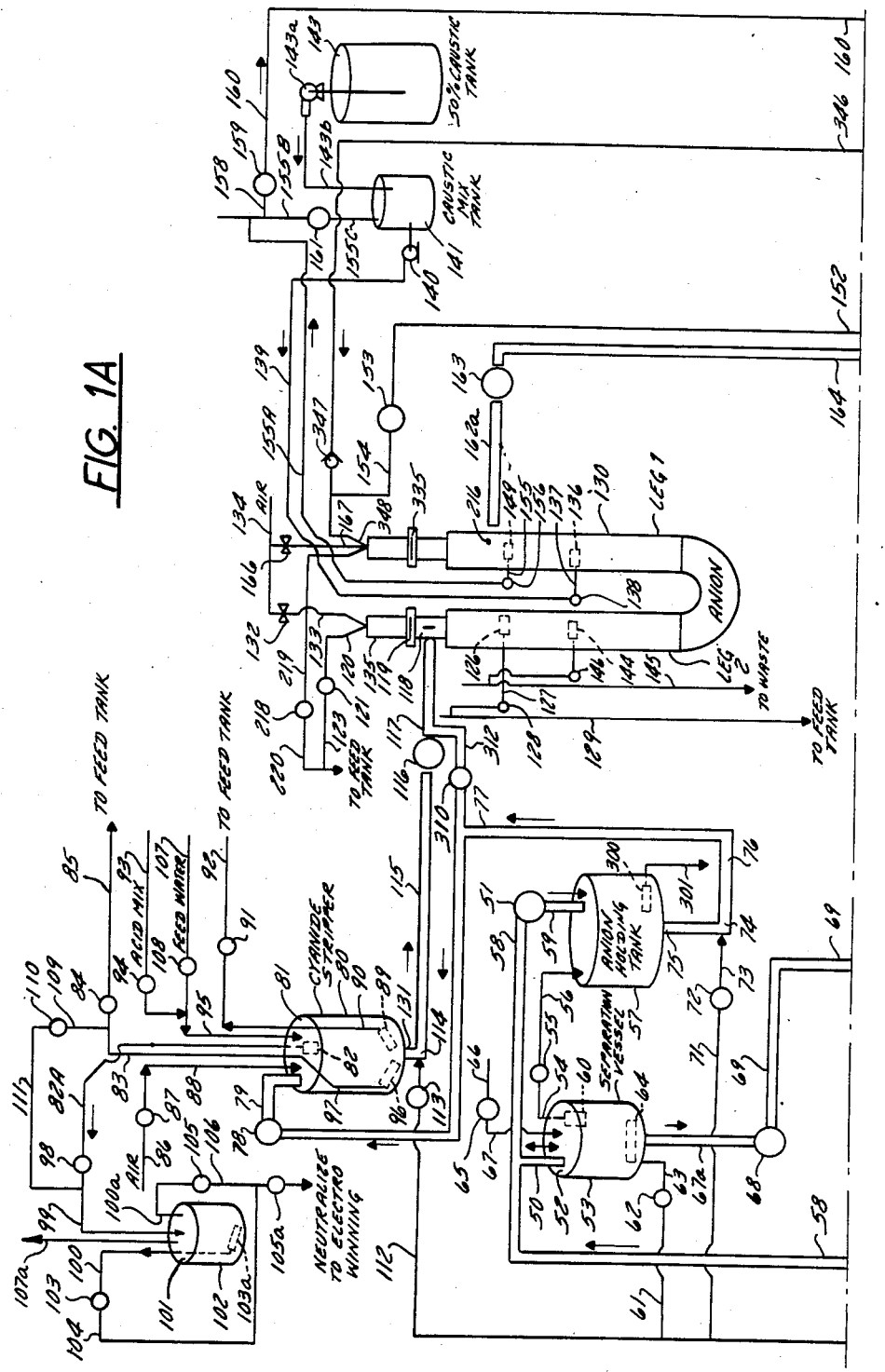

MIXED RESIN BED DEIONIZER

BACKGROUND OF THE INVENTION

This invention concerns itself with a novel method of deionizing water containing substances which may be toxic or of a valuable nature and reducing these substances to a more concentrated form. If valuable, these substances may be recovered by further processing or, if toxic, they can be reduced to a low volume for disposal.

To deionize waters of low contaminant levels, such as 100 ppm or lower, the use of a fixed-mixed resin bed deionizer is suitable, because said fixed-mixed bed deionizer can be sized to operate for a long period of time before regeneration of the resins become necessary. However, when the time comes for the regeneration, problems occur when existing techniques are used. Among these problems is the separation of the resins into discrete zones in the vessel after which the acid and caustic regenerants are caused to flow exclusively into their respective zones without too much comingling which can lessen the capacity of the resins due to the exhaustion within the vessel if the unwanted caustic or acid contacts complementary resins. Several moving bed ion exchange concepts have been described over the years and all have moved an increment of resin from a loading vessel into regeneration and reuse vessels and replacing the resin in the loading vessel in the same time frame, but these resins were of a single species, and not of two or more species.

SUMMARY OF THE INVENTION

This invention avoids this and other problems of conventional systems because from the loading vessel the exhausted mixed resins (loaded resins) are transferred to another series of vessels where the mixed resins are separated into cation and anion resins. The separated resins are transferred to and stored in corresponding holding tanks. From these tanks discrete measured volumes of each resin are periodically transferred into "U" shaped vessels for regeneration.

In the regeneration vessels, the resin volumes are stacked, one and upon the other at one end of the "U," gradually move completely around the "U" shaped vessels to the other end of the "U." Regenerant solutions are introduced from the opposite end, thus imposing counter-current flow through the vessel. To make room for another resin volume, the resin volume at the top of the other end of the "U" which has been regenerated and rinsed of the regenerant solution, is transferred to a holding tank by means of a force of air or liquid introduced at the top of the leg 1, forcing the resin volume slurry out through a resin blocking valve.

The waste solution recovered during regeneration of the resin has a high concentration which is limited on the high side by the regenerant concentration and on the low by the efficiency of the rinsing steps.

This invention thus combines the efficiency of counter-current moving-bed regeneration and its resultant low-volume high-concentrated waste solution, with a fixed-bed loading vessel with its long on-stream processing time.

In the present invention, two ion exchange resins are mixed in a preferred fixed-bed mode in the loading vessel of the deionizer and then the resin is separated and transferred into the counter-current moving-bed regeneration vessels, one for each resin. The regenerated resins are then recombined and transferred as a homogeneous mixed resin bed back into the loading vessel.

IN THE DRAWINGS

FIG. 1A is a schematic view of one portion of the system.

DESCRIPTION OF THE INVENTION

Figure 1B:
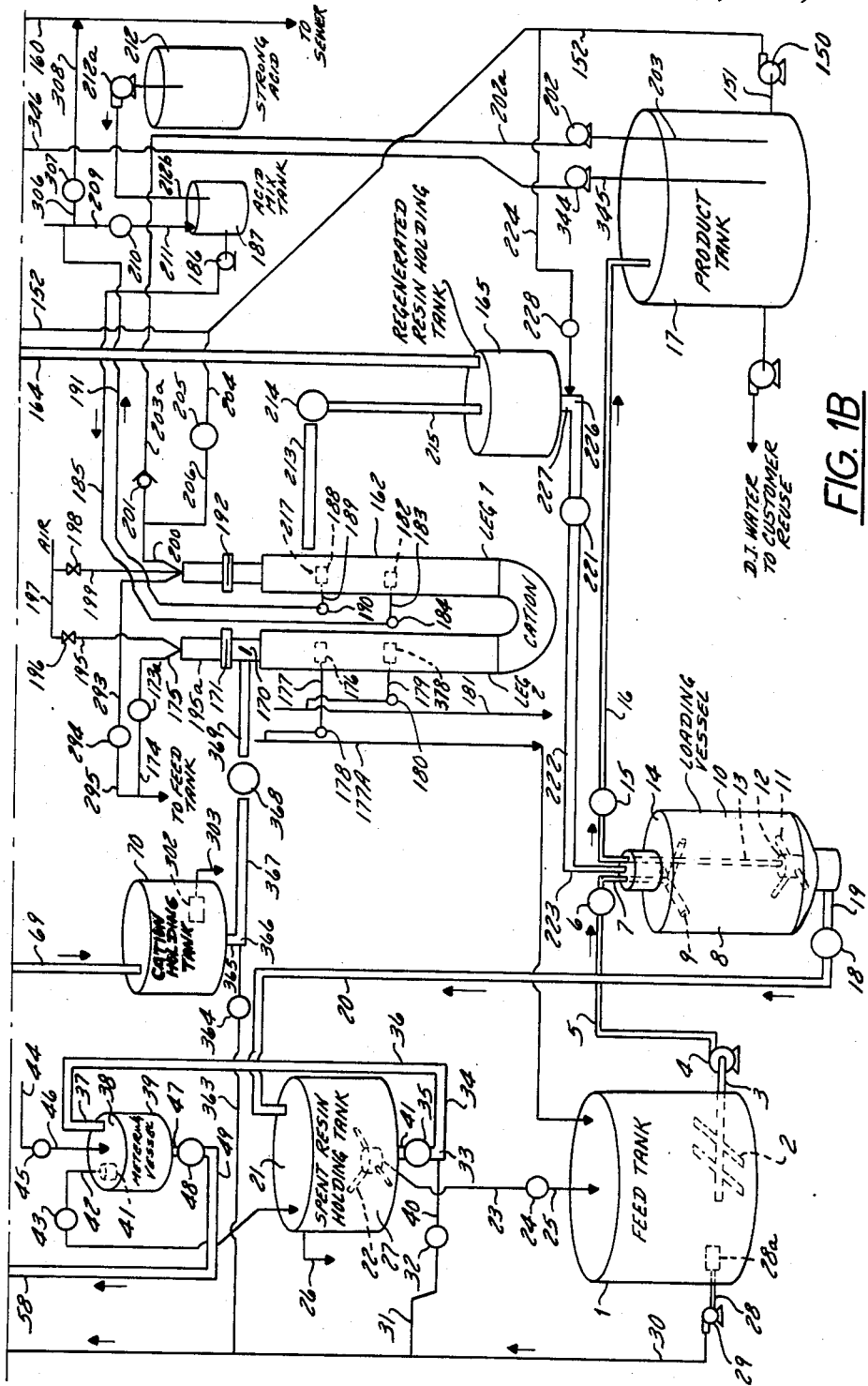
FIG. 1B is a schematic view of the other portion of the system.

Contaminated water or feed water containing substances of value is contained in a tank 1, the feed water is caused to flow to a loading vessel 8 through an outlet distributor system 2, in the tank 1 through a conduit or pipe 3 connected to a pump 4, through a conduit or pipe 5, to a motorized valve 6, and through a conduit or pipe 7 connected to a cover 14 on the top of loading vessel 8. The cover 14 should be sealed on the top of the loading vessel 8 to form a pressure vessel. A mixed resin bed 10, composed of anion and cation resins mixed in a ratio depending on the type of feed water and the type of deionizing desired, is provided in the loading vessel 8. The feed water is evenly distributed over its resin bed by means of a distributor system 9 connected to the pipe 7.

In choosing resins, it may be beneficial to use a weak anion resin to permit the passage through the resins bed of carbonates, silica and other values considered to be weakly ionized, thus maximizing run time and minimizing regenerant consumption. Carbonates in the product water will escape as carbon dioxide, thus increasing the purity of the water. Silica and other weakly ionized nonvolatile substances will remain, however, so the product water is a qualified deionized liquid. In other cases, strong base anion resins may be selected to remove all anions, thus the product could be very pure, e.g., approaching 18 megohm resistivity.

The feed water flows down through the resin bed 10, where the cations and anions sorb onto their respective resins, releasing from the respective resins hydrogen ions and hydroxyl ions which combine to form very weakly ionized water which drives the sorbtion/-desorbtion equilibrium to sorbtion completion because of the ionization inertness of the water thus formed.

The product water exits the mixed resins bed via outlet distributors 11, arranged in a geometric pattern to maximize uniform flow at the lower zones of the mixed resins bed. The outlet distributors 11 are connected to a hub riser arrangement 12, which is connected to a pipe 13 extending through and welded to the cover 14. Product water flows through a motorized valve 15, connected to pipes 13 and 16 into product tank 17.

Eventually the resins will have sorbed ions to their capacity as determined by sensors which monitor the quality of water produced. The product water flow is caused to stop by closing valve 15 when the quality of the water falls below the set point chosen.

Simultaneously and possibly a few moments before valve 15 closes, resin valve 18 is opened causing the mixed resin and water slurry to exit out of loading vessel 8 via conduit 19, which extends through and is welded to the bottom of vessel 8. The resin slurry is conducted to a spent resin holding tank 21 through conduits 19 and 20 connected to resin passing valve 18.

As the mixed resin slurry enters tank 21, excess feed water is drained off by overflow pipe 26, or pumped back to the feed water tank 1 through conduit 23, which extends through the bottom of tank 21, and is connected to an outlet distributor system 22 located at the bottom of tank 21. Conduit 23 is also connected through motor valve 24 to discharge conduit 25, from which the liquid exits to the feed tank 1. Mixed resin 27 accumulates in the holding tank in a generally homogenous mix. Should the resin, slurry, liquid or carry water exit from tank 21 in an optional manner through overflow conduit 26, the resin mix is not as homogenous as above, but does work and provides a benefit by washing out fines, crud, and other fine particulate substances.

The loading vessel 8 is refilled with regenerated mixed resin from the holding tank 165. In this regard, resin valve 221 and water valves 15 and 228 are opened and product or feed water is pumped by pump 150 through lines 151, 152 and 224 and valve 228 to the eductor 226 at the bottom of conduit 227. Eductors of the type contemplated refers to a venturi-type device wherein a liquid is passed through an orifice to create a vacuum that is used to draw resin into the flow line. Eductors of this type can be obtained from Aquamatic, Inc. of Rockford, Ill. The mixed resin and feed water from the eductor flows through line 222 and 223 into the loading vessel 8. As the vessel 8 fills with resin and water, the water will return to the product tank 17 through distributor 11 and lines 13 and 16. Once the loading vessel is filled with resin, pump 150 is turned off, and valves 228 and 221 are closed. Feed water pump 4 is turned on to start the flow of feed water to the loading vessel 8 as described above. The reloading process requires approximately 25 minutes.

RESIN SEPARATION

The next step is to separate the mixed resins into individual types, cation and anion, for separate regeneration in regeneration vessels 162 and 130, respectively. To accomplish this, the resin is first transferred to a metering vessel 39 and then to a separation vessel 53. To accomplish this, water from feed tank 1 is drawn through screen 28a by means of a pump 29 connected to conduit 28 and pumps the feed water through conduit 30 and branch conduit 31 through valve 32 and conduit 40 to eductor 33. The flow of water through eductor 33 proceeds to draw off resin from the bottom of tank 21 through conduit 41 and motor valve 35 and then as a resin slurry through conduits 34 and 36 for discharge through conduit 37 which extends through cover 38 into tank 39. A metered mixed resin volume is formed in tank 39 by preventing resin from exiting vessel 39 by means of screen 41, but allowing the slurry liquid to exit through screen 41 to conduit 42. The slurry liquid then passes through valve 43 and is finally discharged into tank 21.

The resin is moved from metering vessel 39 into separation vessel 53 by closing valves 35 and 43. The feed water continues to flow from pump 29 through conduit 31, valve 32, eductor 33 and conduits 34, 36, and 37 into metering vessel 39. The incoming water forcefully displaces the metered resin volume in metering vessel 39 out as a slurry through conduit 47 which extends through the bottom of vessel 39, through valve 48, and conduits 49, 50 and 58 into vessel 53. Conduit 50 extends through the cover 52 of vessel 53, and is welded in the cover. Excess water exits vessel 53 through screen 60, conduit 54, valve 55 and conduit 56 into anion holding vessel 57 or if preferred back to the feed tank 1 directly.

The resin is actually separated in separation vessel 53, which has a large L/D ratio. A typical flux of water that is the separation medium, is 13 to 16 flux (GPM/area square feet). The length is typically 2.5 times the resin height for the resin volume preferred for a separation, based on a 70 degree Fahrenheit water temperature. If the water is colder and the flow remains the same some cation resin will come over with the anion resins. This is due to the increase in the viscosity of the water, rather than its density.

The anion resin is transferred to the anion holding tank 57 by opening valves 51 and 62. Water is directed into the vessel 53 by pump 29, through conduits 30 and 61, valve 62 and conduit 63 and dispersed through diffuser 64 located at the bottom of vessel 53. The water exits from the top of the vessel 53 through conduit 50, 58, valve 51 and conduit 59. The incoming water expands the resin bed with the lighter anion resin expanding to a greater extent, whereby the uppermost zone of the expanded mixed resin is almost pure anion plus cation resin fragments. Since the water is flowing and exiting out of vessel 53 through conduit 50, approximately 95% or more of the anion resin flows out. To encourage resin separation, means are provided to produce a velocity vector in vessel 53. Such means is in the form of diffuser 64 which causes incoming water to flow tangentially into the vessel which produces a vortex, thereby increasing liquid/anion resin velocity and a resultant increase in anion resin bed expansion over the cation resin bed expansion which assures exiting of the anion resin from vessel 53, while the cation remains behind in 53.

The anion resin continues to accumulate in tank 57, from the resin slurry flow from vessel 53, via the conduits 58 and 59 and valve 51. This continues for a timed period, typically 10 to 20 minutes depending on the volume to be separated. The cation resin which is too heavy for any appreciable amount to transfer with the anion resin remains in vessel 53 as an expanded bed. After the appropriate time limit has expired and no more anion resin is transferred, pump 29 is turned off and valves 51 and 62 are closed. The cation resin remaining in vessel 53 settles to the bottom, likewise the anion resin settles to the bottom of tank 57. Excess transfer water is allowed to drain from vessel 57 back to the feed tank 1 by means of slotted diffuser 300 and conduit 301 to the feed tank, the location of which is slightly above the top of the settled resin.

The cation resin is transferred out of vessel 53 by opening valves 65 and 68 permitting air or water to flow into vessel 53 via the conduit 66, valve 65, and conduit 67 which extends through the cover 52, of vessel 53. The resin exits through conduit 67a which extends through the bottom of vessel 53, through valve 68, and conduit 69, and collects in cation holding tank 70. After a period of time such as several minutes vessel 53 is empty and all the cation resin is now in tank 70. Excess transfer water is removed from vessel 70 by means of slotted diffuser 302 which extends through tank 70 and conduit 303 to the feed tank, the location of which is above the top of the settled resin.

CYANIDE STRIPPING SYSTEM

When the deionizer is employed to remove cyanide or cyanide-metal complexes from cyanide-bearing plating rinse waters, the cyanide ions which have been sorbed by the anion resin must be stripped from the anion resin prior to regeneration of the anion resin. The anion resin is normally directed through a valve 310 in conduit 312 to the regeneration vessel 130 through conduit 117. However, for cyanide removal the anion resin is directed to a subsystem that will strip the cyanides off the resin and break the metal cyanides allowing later cyanide oxidation or recovery.

This is accomplished by directing feed water pumped into conduit 30 by pump 29 into conduit 71. Valve 72 is opened and the water is directed through conduit 73 to eductor 74 which produces a low pressure zone at the bottom of conduit 75. The anion resin at the bottom of tank 57 will be drawn into conduit 76 producing a resin slurry which flows through conduit 77 and open valve 78 and conduit 79, which extends through cover 81, and into cyanide stripping vessel 80. Excess water, less resin, is discharged from the vessel 80 by opening valve 84 which allows the water to pass through screen 96, conduits 97 and 83, which extends through cover 81, through valve 84 and conduit 85, which discharges back to the feed tank.

The vessel 80 is substantially filled with resin with the remaining water layered above the settled resin. This excess water must be removed to prevent too much dilution of the acid when pumped into the vessel 80 to strip the cyanides from the resin. This is accomplished by using air as the energy medium. Valve 87 is opened and air, under pressure of approximately 5 to 15 pounds per square inch, passes through conduit 86, valve 87, and conduit 88, which extends through cover 81, into vessel 80. Valve 91 is opened and the excess water flows through screen 89 which restrains the resin, conduit 90, which extends through the cover 81, of vessel 80, valve 91, and discharges back to feed tank 1, via conduit 92. This can be accomplished in a short time interval since the water remaining in the vessel just covers or may be slightly below the top of the resin bed. A minimum amount of water will be present between the resin beads, thus maximizing effective acid contact and concentration.

The next task is to add acid, preferably sulfuric at about 20% strength, to release the cyanides and metal cyanide complexes from the anion resin, thereby making the anion resin into the sulfate or hydrogen sulfate form. Sufficient acid is added to assure the ion-exchange is complete which would be approximately 1.2 equivalents acid per liter of resin. Valve 94 is opened and acid is allowed to flow through conduit 93, from a central pumping source, through valve 94, and into vessel 80 through conduit 95 which extends through the cover 81 of vessel 80. To allow entry of the acid, valve 98 is opened to vent the vessel 80 to sealed tank 102 through screen 82, vent conduit 82A, valve 98 and conduit 99 which is welded to and through the cover 101 of tank 102. Liquids and gases are accumulated in tank 102 and purged into a caustic medium.

Upon contact with the resin and subsequent penetration into the resin matrix, the acid exchanges the anions on the resin sites for the sulfate or hydrogen sulfate radical of the incoming acid. The cyanides and most cyanide metal complexes are converted to hydrogen cyanide which is weakly ionized thereby causing the chemical reaction equilibrium to shift to completion toward the hydrogen cyanide substance, which dissolves in the liquid media. If the concentration is high enough, the HCN may form a gas and remain suspended or escape from the liquor.

Now that the acid has been added a rinsing task is performed to rinse out acid and the hydrogen cyanide and the metals originally associated with it, as well as other anions. Valve 108 is opened and feed water is pumped by pump 29 through conduit 30 which is connected to conduit 107 (not shown). The feed water passes through valve 108 and the conduit 95 into the vessel 80. The feed water displaces the acid through the resin bed contained in vessel 80 by opening valve 110 which allows the acid to pass through screen 96, conduit 97, branched conduit 109, valve 110, and conduit 111, which is connected to conduit 99, which discharges into sealed vessel 102. Means are provided in vessel 102 to prevent hydrogen cyanide from escaping as a gas. Such means is in the form of a caustic media solution which reacts with the gas to form sodium cyanide or calcium cyanide.

In this regard, as the incoming cyanide-laden liquor enters through line 99, pump 103 is turned on to recycle the liquid through screen 103a, lines 100, 104, 106, 100a and valve 105. The previously added caustic and the incoming cyanide are caused to co-mingle by this action. Thus, the free hydrogen cyanide recombines to form a nonvolatile cyanide complex or salts.

After the proper volume of cyanide-laden liquor has been added, and a few minutes of mixing through lines 100, 104, 106 and valve 105, the contents of vessel 102 may be pumped to the electrowinner by closing valve 105 and opening valve 105A.

The rinsing continues for two or three resin bed volumes which should reduce the cyanide concentration to about 0.001 normal, or less.

There will be some conditions where an optional air purge is initially applied to vessel 80, wherein all the cyanide laden liquor is blown out of vessel 80 and collected in vessel 102. A vent line 107A may be provided to vent air from vessel 102 to a safe area. Subsequent rinsing operations using water are used to purge vessel 80 of liquor which is collected in vessel 102.

ANION RESIN REGENERATION

Following the rinse operation, the anion resin is ready for regeneration. This is accomplished by transferring the resin to the anion regeneration vessel 130, generally shaped as a "U." It should be noted that the regeneration vessel 130 is substantially filled with resin in various stages of regeneration. To transfer the resin, valve 113 is opened and feed water pumped into conduit 30 by pump 29 is caused to flow through conduit 112, valve 113 and eductor 114. The resin is drawn out of vessel 80 by the action of eductor 114 and passes through conduit 131, which extends through the bottom vessel 80. Valve 116 is opened and the resin slurry formed by the eductor 114 flows through conduit 115, valve 116, and conduit 117 which extends into vessel section 118 in leg 2 of vessel 130. The water is separated from the resin by passing through screens 119 and 126, which essentially splits the slurry flow. The resin is restrained from exiting vessel 130 by the aforementioned screens 126 and 119. Excess water passing through screen 119 flows into chamber 135. Valve 121 is opened and the water flows through conduits 120, 123 and valve 121 back to the feed tank. Valve 128 is also opened to allow excess water passing through screen 126 to flow through conduit 127, jackleg 129 and valve 128 to feed tank 1.

Some resin packs against the screen 119. The next task is to drop this resin down against the resin packed around screen 126 and previously layered in leg 2 of vessel 130. This is accomplished by applying air under a 10 to 30 psi gauge pressure to chamber 135 at the top of leg 2 of vessel 130. Valve 132 is opened to allow air to flow through conduit 134, valve 132 and conduit 133, which extends into chamber 135. The increase in pressure of the water in the chamber 135 causes the resin packed against screen 119 to drop and pack against the resin previously transferred to vessel 130. The resin will layer below and above screen 126 leaving a resin void at the upper region of vessel section 118. The excess water causing the resin to drop exits through screen 126, and conduit 127 which extends through vessel 130 at the location approximately shown, and continues through valve 128 and conduit 129 which constitutes a jack leg, and discharges back into feed tank 1.

The transfer operation may be repeated since eductor 114 efficiency is sometimes reduced if a back pressure is created when resin packs tightly against a screen. The amount of resin added to the vessel 130 is approximately 10% of the anion resin present in the loading vessel, although any volume near 10% is permissible if correct volume of regenerant and rinse water is provided, to keep vessels associated with process work at an economical cost level.

The anion regeneration vessel 130 is essentially full of anion resin from screen 119 to screen 335, with water located above the resin in the topmost sections.

The regenerant is now added to vessel 130 by means of pump 140 which is connected to caustic mix tank 141 by conduit 139. Valve 138 in conduit 139 is opened and caustic mix is pumped in through conduit 137 and screen 136. Valve 146 is opened so that the flow of regenerant solution disperses evenly through the resin bed towards the waste port at outlet screen 144. The regenerant is added at a concentration calculated to give a volume that is some fractional multiple of the resin void volumes located between inlet screen 136 and outlet screen 144. The regenerant is discharged through screen 144 to a jack leg 145 through valve 146 for delivery to waste. As each volume of regenerant is added to the vessel 130, an equal volume is discharged. This is to assure laminar zones of regenerant having increasing concentrations of what may be considered waste, or in some cases a desired substance in solution, or particulate values in suspension.

In the case of the anion resin regeneration caustic is supplied in a dilute solution, generally around 8%, from tank 141, and caused to flow by pump 140, through conduit system 139.

After the correct volume of regenerant solution is added, as determined a priori by the resin capacity, it is necessary to add a measured volume of rinse water termed a "displacement rinse" equal to the interstitial resin volume, e.g., the resin void volume for one transfer resin volume into vessel 130 and obviously an equal volume of resin transferred out of vessel 130. This gentle and relatively small volume of rinse water moves the regenerant and its interface downward in leg 1 of vessel 130 and maximizes the concentration of regenerant in contact with the resin and "waste" exiting from vessel 130. Generally, deionized water is used for this displacement rinse.

To accomplish this displacement task, deionized water is caused to flow from product tank 17, in this case the product is deionized water, by pump 344, conduits 345, 346, 348 and check valve 347. The latter extends through the top of leg 1 vessel 130, as shown. The deionized water then displaces the regenerant solution down in leg 1 and the now gradiently produced "waste" solution, and up the leg 2. The liquid lying above screen 144, which is essentially feed water, is also displaced upward in leg 2 and exits out of vessel 130 as feed water through conduit 120, which extends through the top of vessel 130, and valve 121, and then discharges back to feed tank via conduit 123. Generally a timer controls this event, if positive displacement pump is used. Otherwise a sensor may be incorporated in the caustic tank as a liquid level device.

There is still some concentration of regenerant solution, generally about 0.1 to 0.2 normal remaining in the displacement zone above screen 149. This weak regenerant solution is now recovered and used to dilute the strong caustic solution by supplying a volume of deionized water as before with the above displacement rinse, but the volume is equal to an amount that will give the correct regenerant concentration. This task is accomplished by the same pumps and conduits as above but a different time frame is used by a preferred exclusive timer to control this task. Alternately, a liquid level sensor may be used in caustic mix tank 141 to determine the correct volume of deionized diluent water. The concentration of regenerant remaining in the resin voids would be approximately 0.1 to 0.01 normal.

This second rinse operation, termed the recovery rinse because the water is recovered as caustic diluent water, is accomplished by having the water pumped from tank 17 by pump 344 through conduits 345, and 346, one-way valve 347 and conduit 348 for a timed period, rinsing the resin in the top of leg 1, exiting through screen 149, valve 156 and conduit 155 which extends into vessel 130 as shown, conduits 155A and 155B, valve 161 and conduit 155C to tank 141, to be used for later diluting of strong caustic solution when the latter is pumped from tank 143. In this regard, pump 143a is used to pump a predetermined amount of caustic solution through conduit 143b into tank 141.

A polish rinse is now applied to remove essentially all regeneration solution from the resin bed located above screen 149. The concentration will be 0.01 to 0.001 normal or less. A sensor, 216, usually resistivity, measures the ohms and at some point stops this task. This is accomplished by feeding deionized water from tank 17 through conduit 151, and conduit 154, 348, pump 150, conduits 152 and valve 153, to the top of leg 1 of vessel 130, thence out of vessel 130 through screen 149, valve 156, conduits 155, 155A, 158, and 160 and valve 159 to the sewer, or in some cases back to the feed tank when water must be more tightly conserved.

The resin is transferred out of vessel 130, by opening valve 163, and valve 166, where either deionized water or, as preferred, air is caused to flow at some pressure, such as 10–30 psi through conduits 134 and 167, the latter of which extends through the cap at the top section of leg 1 of vessel 130 which forces the water and resin out by virtue of a water layer above the resin volume located below screen 335. This water volume displaces the resin out through conduit 162a, which extends through the wall of vessel 130, through valve 163, and conduit 164 and discharges the resin into regenerated resin holding tank 165. This step is the primary metering means of each volume of resin being regenerated.

Because there is now obviously a resin void where the resin transferred out previously existed, the next step is to shift the resin from leg 2 of vessel 130 to the leg 1, where the resin is constrained at screen 335. This is accomplished by applying an air pressure of 10 to 30 psi at the top of leg 2 of vessel 130 by means of air inlet line 134, valve 132, conduit 133 which extends to and through section 135. The air imposes a force on the water located at the top of leg 2, which moves down, displacing the resin below it, and forcing the resin down in leg 2 and up in leg 1. While shifting resin into leg 1 of vessel 130, leg 1 is vented back to the feed tank through conduit 219, which extends into the top of vesel 130, valve 218 and conduit 220. This permits liquid or air to exit from leg 1, thus permitting ease of resin transfer. After this "shift" a resin void now exists at the top of leg 2, so that after a new lot of spent cation resin has been transferred, as previously described, a packed resins bed will again exist in vessel 130.

CATION RESIN REGENERATION

Resin is transferred to the cation regeneration vessel 162, generally shaped as a "U" from the cation resin holding tank 70. To do this, valve 364 and 368 are opened and feed water pumped into conduit 30 by pump 29 flows through conduit 363, valve 364 and eductor 366. The resin in vessel 70 is drawn out of vessel 70 by the vacuum created by eductor 366 at the lower end of conduit 365, which extends through the bottom of vessel 70. A resin slurry is formed in conduit 367 which flows through valve 368 and conduit 369 into vessel section 170 in leg 2. The water is separated from the resin by screens 171 and 176 in leg 2 of vessel 162. A partial flow of water exits out through the chamber 195a at the top of leg 2 and out through conduit 175, 174 and valve 173a.

Some resin packs against screen 171, and the next task is to drop the resin down against the resin previously transferred to vessel 162. This is accomplished by opening valves 196 and 178. Air under a 10 to 30 psi gage pressure is applied through conduits 197 and 195, which extend into vessel section 195a. The incoming air displaces water in the section 195a, and thereby causes resin to drop and pack against the resin previously transferred to vessel 162, thus allowing a resin void at the upper region of vessel section 170. The excess water causing this resin drop passes through screen 176 and conduit 177 which extends through vessel 162 at the location approximately shown, and continues through valve 178 and conduit 177A which constitutes a jack leg, and discharges back into feed tank 1. The above steps are repeated to refill section 170 with resin.

The cation regenerant vessel 162, is essentially full of cation resin from screens 171 to 192, with water layered above them in the topmost sections.

The regenerant is added to vessel 162 by opening valve 184 and starting pump 186 to deliver regenerant from tank 187 through conduit 185, valve 184 conduit 183, which extends through the wall of vessel 162 and screen 182. Valve 180 is opened so that the regenerant solution flows toward the outlet screen 378 and is dispersed evenly through the resin bed located in the zone between screens 182 and 378. The regenerant is added at a concentration calculated to give a volume that is some fractional multiple of the resin void volume between inlet screen 182 and outlet screen 178 in leg 2. This is to assure synchronized interface of increasing concentrations of what may be considered waste, or in other cases a desired substance in solution, or particulate values in suspension. The waste product for salts to be recovered (if valuable) are removed by opening valve 180 to allow the concentrated values to exit through outlet screen 378, conduit 179, valve 180, and jackleg 181 to the waste line. In cases of removal of toxic metals, these may be concentrated to high values such as 20,000 ppm, suitable for a preferred electro-winning by electro-chemical system.

In the case of the cation resin regeneration acid is supplied as a dilute solution, generally around 20%, from tank 187, and caused to flow by pump 186, through conduit system 185.

After the correct volume of regenerant solution is added, it is necessary to add a measured volume of rinse water termed a "displacement rinse" equal to the interstitial resin volume of that quantity of resin transferred into vessel 162. This gentle and relatively small rinse moves the regenerant and its interface downward in leg 1 of vessel 162 and maximizes the concentration of regenerant in contact with the resin and "waste" exiting from vessel 162. Generally, deionized water is used for this displacement rinse.

To accomplish this displacement task, deionized water is caused to flow from product tank 17, in those cases where the product is deionized water, by pump 202 and its associated valve 201, and conduits 203, 202a, 203a and 200. The latter extends through the top of leg 1 of vessel 162. The deionized water then displaces the regenerant solution down in leg 1 and also displaces the now gradiently produced "waste" solution, up the leg 2. The liquid lying above screen 378, which is essentially feed water is also displaced upward in leg 2 and exits out of vessel 162 as feed water through conduit 175, which extends through the top of vessel 162, and valve 173a, and then discharges back to feed tank via conduit 174.

There is still some concentration of regenerant solution, generally about 0.1 to 0.2 normal, remaining in the displacement zone above screen 188. This weak regenerant solution is now recovered and used to dilute the strong acid solution by supplying a volume of deionized water as before with the above displacement rinse, but that volume is equal to an amount that will give the correct regenerant concentration.

This second rinse operation, termed the Recovery Rinse because the water is recovered as acid diluent water, is accomplished by again turning on pump 202 for a timed period, or a fixed volume determined by a liquid level sensor, to deliver deionized water through conduit 202a, 203a, check valve 201, conduit 200 through screen 192 at the top of leg 1 of vessel 162. The water exits through screen 188 and conduits 189 and 191 and valve 190 to conduit 209 and valve 210 located at the acid mix tank 187 to enter that tank 187 through conduit 211 to be used for diluting strong acid when it is pumped into acid mix tank 187. After this recovery rinse task, the normality of the liquid in the locale of outlet screen 188 is approximately 0.1 to 0.01 normal. Strong acid is then pumped into tank 187 from tank 212 by pump 212a through conduit 212b.

A polish rinse is now applied to remove essentially all regeneration solution from the resin bed located above screen 188. A sensor, 217, usually resistivity, measures the ohms and at some point stops this task. The concentration will be approximately 0.01 to 0.001 normal or less. This is accomplished by feeding deionized water from tank 17 through conduit 151, pump 150, conduits 152, 204, 206 and 200, valve 205 to the top of leg 1 of vessel 162, thence out of vessel 162 through screen 188 valve 190, conduits 189, 191, 306, 308 and valve 307 to the sewer, or in some cases back to the feed tank when water must be more tightly conserved.

The resin is transferred out of vessel 162 by opening valve 214, and valve 198, where either deionized water or, as preferred, air is caused to flow at some pressure, such as 10-30 psi through conduits 197 and 199, the latter of which extends through the cap of the top section of vessel 162 which forces the resin out by virtue of water layer above the resin volume located below screen 192. This water volume displaces the resin out through conduit 213, which extends through the wall of vessel 162, through valve 214 and conduit 215 and discharges the resin into regenerated resin holding tank 165.

Because there is now obviously a materials void where the resin transferred out previously existed, the next step is to shift the resin from leg 2 of vessel 162 to the leg 1, where the resin will be constrained at screen 192. This is accomplished by applying an air pressure of 10 to 30 psi at the top of leg 2 of vessel 162 by means of air inlet line 197, valve 196, conduit 195 which extends to and through section 195A. The air imposes a force on the water located at the top of leg 2, which moves down, displacing the resin below it, and forcing the resin down in leg 2 and up in leg 1. While shifting resin in leg 1 of vessel 162, leg 1 is vented back to the feed tank through conduit 293, valve 294 and conduit 295 which permits ease of resin transfer. After this "shift" a resin void now exists at the top of leg 2, so that after a new lot of spent cation resin has been transferred, as previously described, a packed resin bed will again exist in vessel 162.

The embodiments of the invention in which an exclusive property or privilege is claimed, are defined as follows:

1. A mixed resin moving bed water treatment assembly comprising
    a loading vessel containing a mixed bed of anion and cation exchange resins,
    means for conducting a feed water to be deionized to the loading vessel,
    means for collecting product water or deionized water from the loading vessel after passing through the mixed resin bed and
    a regeneration assembly for regenerating spent resins removed from said loading vessel and returning regenerated resin to the loading vessel, said assembly including
    a spent resin holding tank,
    means for transferring spent resin from the bottom of said loading vessel into said spent resin holding tank,
    an anion resin regeneration vessel,
    a cation resin regeneration vessel,
    a separation vessel, means for transferring spent resin from said holding tank to said separation vessel, means for separating the anion resin into the top of said separation vessel and the cation resin into the bottom of said separation vessel,
    means for transferring the anion resin from the top of said separation vessel to the anion regeneration vessel,
    means for transferring the cation resin from the bottom of said separation vessel to the cation regeneration vessel,
    means for passing a caustic regenerant through the anion regeneration vessel to regenerate the anion resin,
    means for passing an acid regenerant through the cation regeneration vessel to regenerate the cation resin,
    means for rinsing the regenerated anion resin,
    means for rinsing the regenerated cation resin,
    means for transferring the regenerated anion resin and the regenerated cation resin from their respective regeneration vessels to a holding vessel and
    means for returning the regenerated resins from the holding vessel to the loading vessel.

2. The assembly according to claim 1 wherein said anion regeneration vessel is in the form of a "U" and said cation regeneration vessel is in the form of a "U."

3. The assembly according to claim 2, wherein said means for transferring the anion resin to the anion regeneration vessel is connected to one leg of the "U"-shaped regeneration vessel and
    said means for transferring the regenerated anion resin to the holding vessel is connected to the other leg of the "U"-shaped vessel and
    said means for transferring the cation resin to the cation regeneration vessel is connected to one leg of the cation regeneration vessel and
    said means for transferring the regenerated cation resin to the holding vessel is connected to the other leg of the regeneration vessel.

4. The assembly according to claim 3 wherein said means for passing a caustic regenerant through the anion regeneration vessel is connected to the other leg of the regeneration vessel and is discharged from said one leg of said regeneration vessel and
    said means for passing an acid regenerant through the cation regeneration vessel is connected to said other leg of the cation regeneration vessel and is discharged from said one leg of said cation regeneration vessel whereby said regenerants pass counter to the direction of movement of the resin through the regeneration vessels.

5. The assembly according to claim 1, including a cyanide stripping assembly connected between said separation vessel and said anion regeneration vessel, whereby cyanide ions are removed from said anion resin prior to admission to said regeneration vessel.

6. A process for deionizing water comprising the steps of loading a loading vessel with a mixed bed of regenerated anion and cation resins,
    passing a feed water through the loading vessel to deionize the feed water,
    removing the exhausted mixed resins from the bottom of said loading vessel to a holding tank,
    transferring metered amounts of the loaded or exhausted resin to a separation vessel,
    passing feed water through said separation vessel to separate the anion resins to the top of said separation vessel and the cation resins to the bottom of said separation vessels,
    transferring the anion resins to an anion holding tank,
    transferring the cation resins to a cation holding tank,
    transferring predetermined amounts of anion resin and cation resin from the holding tanks to their corresponding regeneration vessels,
    passing the anion resin and the cation resin through their respective regeneration vessels in a step-by-step manner,
    passing regenerants through the regeneration vessels counter to the direction of movement of the resins in each step of movement of the resins and removing a predetermined amount of regenerated resins from the regeneration vessels to a regenerated resin holding tank after each step of movement.

7. A mixed resin moving bed deionization apparatus comprising
 a loading vessel containing a mixed bed of anion and cation exchange resins,
 means for conducting feed water to be deionized to the loading vessel,
 means for collecting product water or deionized water from the loading vessel after passing through the mixed resin bed and
 a regeneration assembly for regenerating spent resins removed from said loading vessel and returning regenerated resins to the loading vessel, said assembly including
 a spent resin holding tank,
 means for transferring spent resin from the loading vessel to the spent resin holding tank,
 a metering vessel,
 means for transferring spent resin from the spent resin holding tank to the metering vessel,
 a separation vessel,
 means for transferring metered amounts of mixed resin from the metering vessel to the separation vessel,
 means for separating the anion resin into the top of the separation vessel and the cation resin into the bottom of the separation vessel,
 an anion regeneration vessel filled with a number of volumes of anion resin,
 means for transferring the separated volume of anion resin from the separation vessel to the anion regeneration vessel,
 a cation regeneration vessel filled with a number of volumes of cation resin,
 means for transferring the separated volume of cation resin from the separation vessel to the cation regeneration vessel,
 means for passing an anion regenerant through the anion regeneration vessel to regenerate the anion resin,
 means for passing a cation regenerant through the cation regeneration vessel to regenerate the cation resin,
 means for passing water through the regeneration vessel to rinse the anion resin,
 means for passing water through the cation regeneration vessel to rinse the cation resin,
 means for transferring one volume of regenerated anion resin and one volume of the regenerated cation resin from their respective regeneration vessels to a holding vessel and
 means for refilling the loading vessel with regenerated resins from the holding vessel.

8. The assembling according to claim 7 wherein said anion regeneration vessel is in the form of a "U" having first and second legs and said cation regeneration vessel is in the form of a "U" having first and second legs.

9. The assembly according to claim 8, wherein said means for transferring the anion resin to the anion regeneration vessel is connected to the top of the second leg of the "U"-shaped regeneration vessel and said means for transferring the cation resin to the cation regeneration vessel is connected to the top of the second leg of the "U"-shaped regeneration vessel.

10. The assembly according to claim 9 wherein said means for passing said regenerant through the anion regeneration vessel is connected to the first leg of said regeneration vessel and is discharged from the second leg of said anion regeneration vessel and
 said means for passing a regenerant through the cation regeneration vessel is connected to said first leg of the cation regeneration vessel and is discharged from said second leg of said cation regeneration vessel whereby said regenerants pass counter to the direction of movement of the resins through the regeneration vessels.

11. The assembly according to claim 7 including a cyanide stripping assembly connected between said separation vessel and said anion regeneration vessel, whereby cyanide ions are removed from said anion resin prior to admission to said regeneration vessel.

12. A process for deionizing water comprising the steps of
 loading a loading vessel with regenerated anion and cation resins,
 passing a feed water through the loading vessel to deionize the feed water,
 removing all of the exhausted mixed resins from the bottom of the loading vessel to a holding tank,
 transferring metered amounts of the loaded or exhausted resin to a separation vessel,
 passing feed water through said separation vessel to separate the anion resins from the cation resins into the top and bottom of the separation vessel, respectively,
 transferring the anion resins to an anion holding tank, and
 transferring the cation resins to a cation holding tank
 transferring predetermined amounts of anion resin and cation resin to its corresponding "U"-shaped regeneration vessels,
 passing the anion resins and the cation resins through their respective regeneration vessels in a step-by-step manner,
 passing regenerants through the regeneration vessels counter to the direction of flow of the resin in each step of movement of the resins
 and removing predetermined amounts of regenerated resin from the regeneration vessels to a regenerated resin holding tank.

13. The process according to claim 12, including the step of transferring the anion resins through a cyanide stripping assembly prior to transferring to the regeneration vessel.

14. A regeneration assembly for regenerating exhausted mixed resins, said assembly including
 an exhausted resin holding tank,
 a metering vessel operatively connected to said holding tank,
 eductor means for transferring exhausted resin from said holding tank to said metering tank,
 a resin separation vessel operatively connected to said metering tank,
 eductor means for transferring the metered amount of mixed resin in said metering vessel to said separation vessel,
 an anion resin holding tank,
 first conduit means connecting said anion resin holding tank to the top of said separation vessel,
 a cation holding tank,
 second conduit means connecting said cation holding tank to the bottom of said separation vessel, means for injecting water into said separation vessel to separate the anion resin from the cation resin, first valve means in said first conduit means for allowing the separated anion resin to flow into said anion resin holding tank, second valve means in said second conduit means for allowing the separated cation resin to flow into said cation resin holding tank, an anion resin regeneration vessel operatively connected to said anion resin holding tank and being filled with anion resin means for transferring predetermined volumes of anion resin from said anion resin holding tank to one end of said anion regeneration vessel, means for passing a caustic regenerant through said anion regeneration vessel, a cation resin regeneration vessel operatively connected to said cation resin holding tank, means for transferring a predetermined volume of cation resin from said cation resin holding tank to one end of said cation resin regeneration vessel, means for passing an acid regenerant through said cation resin regeneration vessel, a regenerated resin holding tank operatively connected to each of said regeneration vessels, and means for discharging a predetermined amount of resin from the other end of each of said regeneration vessels into said regenerated resin holding tank.

15. The assembly according to claim 14 including means for displacing the resin in each of said regeneration vessels toward the other end of said regeneration vessels to refill the space in said other end of said regeneration vessels vacated by said discharged volume of resin.

* * * * *